Dec. 15, 1942.                    Z. LITTMAN                    2,305,176
                      CASTER ATTACHMENT FOR FISHING RODS
                            Filed Sept. 5, 1940
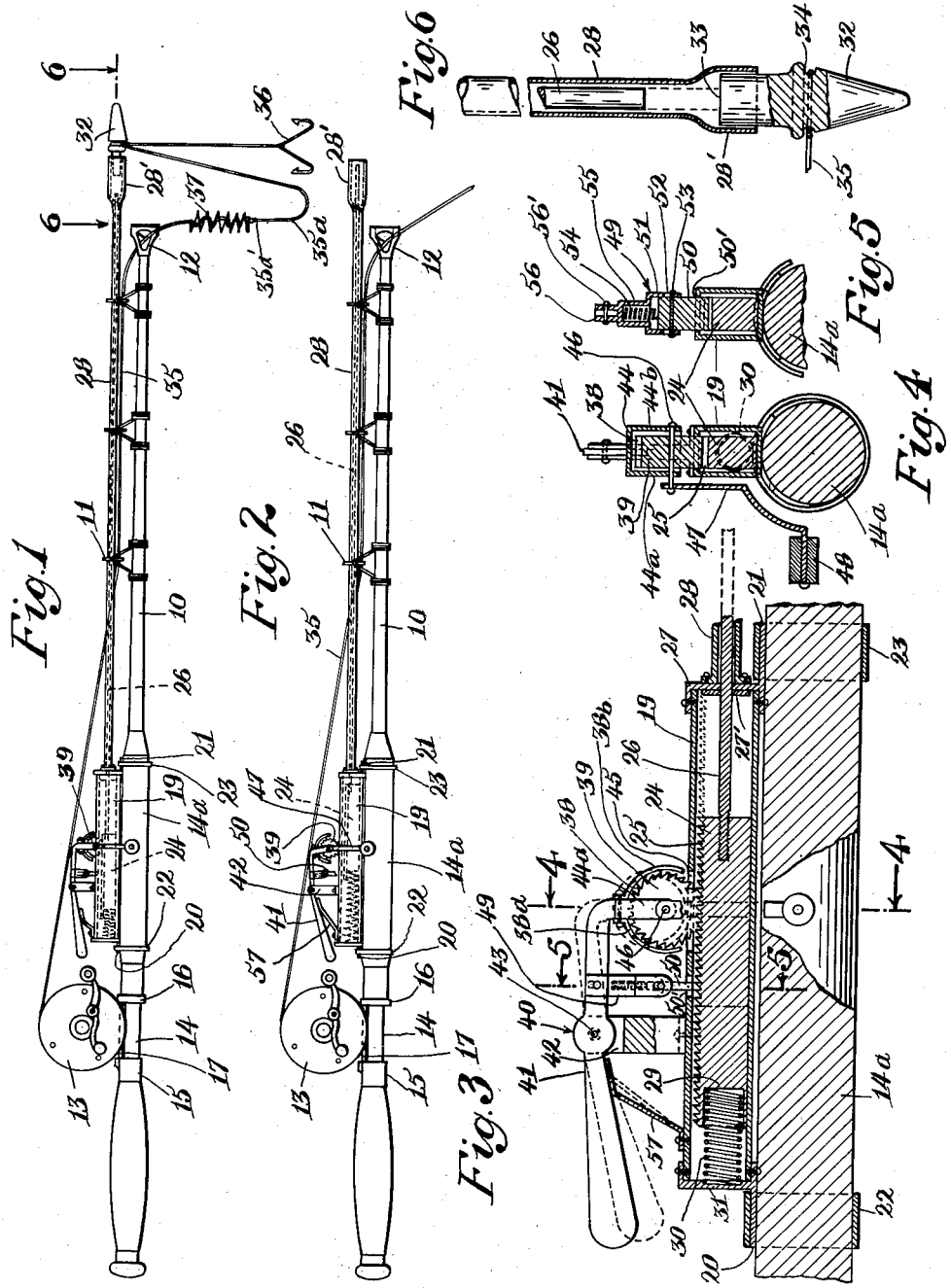
ZENO LITTMAN
INVENTOR
BY *Alexander Mencher*
ATTORNEY Patented Dec. 15, 1942

2,305,176

UNITED STATES PATENT OFFICE 2,305,176

CASTER ATTACHMENT FOR FISHING RODS

Zeno Littman, New York, N. Y.

Application September 5, 1940, Serial No. 355,473

6 Claims. (Cl. 43—19)

This invention relates generally to removable caster attachments for fishing rods whereby the bait and line can be projected without the casting movement of the rod as heretofore employed.

The main object of the invention resides in the provision of a light, compact and removable attachment for mechanically throwing the fishing line of a conventional fishing rod and reel.

A further object of the invention resides in the provision of mechanism which is applied to the conventional fishing rod and reel without changing or modifying the standard parts and positions thereof, the said mechanism being easily removable either before or after projection of the line.

These objects and other incidental ends and advantages of the invention will hereinafter appear in the progress of the disclosure and as pointed out in the appended claims.

Accompanying this specification is a drawing showing preferred forms of the invention wherein corresponding reference characters designate corresponding parts throughout the several views and wherein:

Figure 1 is a side view in elevation showing a conventional fishing rod and reel with the casting mechanism attached thereto and in a position ready to project the line.

Figure 2 is a view similar to Figure 1 after projection of the line.

Figure 3 is a fragmentary and enlarged longitudinal section taken in the vertical plane of the projection mechanism secured to the fishing rod.

Figure 4 is a sectional view of Figure 3 through the plane 4—4 thereof.

Figure 5 is a sectional view of Figure 3 through the plane 5—5 thereof.

Figure 6 is an enlarged and fragmentary longitudinal sectional view of the sinker secured to the end of the projection tube.

In accordance with the invention and the preferred forms shown, numeral 10 represents a conventional fishing rod having guides 11, an end guide 12 and a reel 13, the latter being secured near the rod handle as at portion 14 in the usual manner as by the use of slidable rings 15 and 16 engaging end lugs of a base or securing member 17 attached to reel 13. A line 35 from reel 13 passes through the guides 11 and 12 and has secured near the end a weight or sinker 32 and hooks 36. Adapted to cooperate with the above described conventional fishing rod is a propelling mechanism which causes mechanical projection of the fishing line. This mechanism shown in Figures 1, 2 and 3 is preferably associated with an elongated housing 19, preferably square in cross-section, and is secured to fishing rod 10 forwardly of reel 13 as at portion 14a by any means such as projecting end base lugs 20 and 21 engaged by slidable rings 22 and 23. Slidable within housing 19 is a rack 24 having teeth 25 on the upper surface, the said rack having secured at the front end thereof as by threaded engagement a rod 26 projecting through a detachable end wall 27 of housing 19. Rod 26 is provided with an outer sleeve or tubular member 28, the said tubular member 28 being preferably detachably secured to the outside surface of end wall 27. At the opposite end of rack 24 there is provided a cut-out portion 29 to nest one end of a compression spring 30, the other end of the spring engaging the rear end wall 31 secured to housing 19.

As shown in Figures 1 and 2, the tubular member 28 housing the rod 26 (which serves as a piston rod), is adapted to pass through guides 11 above the line 35, the outer end of said tubular member being expanded as at 28' to frictionally receive the rear end 33 of sinker member 32. Upon the expansion of compression spring 30, piston rod 26 delivers a sharp blow to end 33 of the sinker member thereby causing projection of the line 35 and hooks 36. It is to be observed that the head of the sinker member 32 is preferably provided with a groove 34 around which the fishing line 35 is knotted inwardly of the end and continues a distance for attachment thereto of hooks 36 and bait. The line 35, as in the use of the rod and reel without the projection mechanism attached, extends from reel 13 and proceeds through guides 11 and 12.

Line 35, when the projection mechanism is in use, has a slack portion 35a which forms a fold between end guide 12 and sinker 32 mounted in tubular end 28', the latter, as shown in Figures 1 and 2, projecting slightly beyond end guide 12. A side 35a' of the fold adjacent end guide 12 is preferably provided with a compression spring 37 which causes a portion of line 35 running therewithin to be folded, thereby affording a degree of slack necessary to prevent snapping of the line 35 when the latter is jerked by the projection of sinker member 32 after the release of compression spring 30. It should be noted that spring 37 in line 35 may be retained for manual casting to prevent snapping of the line.

Suitable means are provided for the compression of spring 30 and the release thereof. As shown, however, teeth 38 of a ratchet wheel 39 are adapted to engage the rack teeth 25, the wheel being mounted above housing 19 by means of a lever 40 having a longitudinal arm 41 secured intermediate its length between two opposite uprights 42 secured to the side walls of housing 19 by means of a pivot 43. Lever 40 at the forward end has a depending inverted U-shaped member 44 having side walls 44a and 44b between which walls ratchet wheel 38 is rotatably mounted as by a pin 46 keyed to said wheel.

Wheel 38 penetrates the upper wall of housing 19 through opening 45 to engage the rack teeth 25. One end of pin 46 has secured thereto a bell crank lever 47 having a rotatable handle 48 whereby the ratchet wheel 38 may be made to move the rack 24 rearwardly to compress spring 30 against the rear wall or end 31 of housing 19 and at the same time draw in piston rod 26. Suitable shields 38a and 38b against teeth 38 are provided.

Intermediate depending U-shaped member 44 and pivot 43 is a depending housing 49 within which is mounted a pawl 50. Housing 49 at the lower end has an inverted U-shaped member 51 in which pawl 50 rides, the side walls of said member having vertically disposed slots 52 through which a pin 53 keyed to pawl 50 is movably engaged. Extending from the upper end of pawl 50 is a compression spring 54, the latter penetrating a tubular bore in an upper reduced portion 55 of housing 49, the said housing 49 being secured to arm 41 by means of a top U-shaped member 56 engaging said arm by pin 56' penetrating therethrough.

Thus, pawl 50 penetrating the top wall of housing 19 through opening 50', permits rack 24 to be moved rearwardly against spring 30 within housing 19 by the turning of bell crank lever 47 and prevents the forward movement of the rack 24 after the limit of rotation of ratchet wheel 39 is reached. The slots 52 in the walls of the U-shaped member 51 of housing 49 permit limited vertical yieldability of pawl 50 whereby the latter may slide over teeth 25 of rack 24 when said rack is moved rearwardly, while the compression spring 54 causes the pawl 50 to engage rack teeth 25 to prevent reverse movement of rack 24.

Arm 41 rearwardly of pivot 43, is provided with a spring 57 preferably secured to the upper end of housing 19 whereby the lever 40 is under normal tension for engagement of ratchet wheel 39 and pawl 50 with the rack teeth 25. In order to release rack 24 whereby spring 30 forces the latter forwardly and against a bumper 27' on end wall 27 of housing 19 to project the line 35 by means of a hammer blow of piston rod 26 against sinker 32, it is necessary that both the ratchet wheel 39 and pawl 50 disengage the rack teeth 25. For this purpose, downward hand pressure is applied to the outer end of arm 41 whereby ratchet wheel 39 first is released from the rack 24 and thereafter pawl 50 is disengaged. Upon release of pressure on arm 41, ratchet wheel 39 and pawl 50 re-engage the rack teeth 25. It is to be remembered that the force which throws line 35 out is controlled by the length and quality of spring 30.

I wish it understood that minor changes and variations in the material, location, integration, subcombination and arrangement of parts, may all be resorted to without departing from the spirit of the invention and without departing from the scope of the appended claims.

I claim:

1. In a fishing rod and reel supported thereby, means to mechanically cast the weight and line connected thereto including a housing securable to said rod, releasable power means within said housing at one end, an auxiliary housing communicating with said housing and securable to said rod, the line weight being frictionally engaged to the opposite open end of said auxiliary housing, an intermediate movable member within the housings connected to the power means and adapted to strike the said weight whereby the weight is projected to carry the line therewith for casting purposes.

2. In a fishing rod and reel supported thereby, means to mechanically cast the weight and line connected thereto including a housing securable to said rod, an auxiliary housing communicating with said housing and securable to said rod, a compressible spring mounted within said housing at one end, a plunger member mounted within said auxiliary housing and being connected to one end of said compressible spring, a line weight and engaging means therefor at the end of the auxiliary housing, means to compress the compressible spring and means to release the said spring after compression whereby the plunger member strikes the line weight and projects the same with the line thereon for casting purposes.

3. In a fishing rod and reel supported thereby, means to mechanically cast the weight and line connected thereto including a housing securable to said rod, an auxiliary housing communicating with said housing and securable to said rod, a compressible spring mounted within said housing, a plunger member mounted within said housing and being connected to one end of said compressible spring, a line weight, engaging means for said line weight at the end of the auxiliary housing in alignment with and opposite the plunger member, means to compress the compressible spring and means to release the said spring after compression whereby the plunger member strikes the line weight and projects the same with the line for casting purposes.

4. A line throwing attachment for a fishing rod and reel including a housing securable along said rod, a compressible spring within said housing, a tubular member communicating with said housing and securable to said rod, a line weight at the end of the tubular member, a plunger movable along said tubular member and actuated by said compressible spring, means to compress and means to release said spring after compression whereby the plunger member strikes the line weight and projects the same with the line for casting purposes.

5. A line throwing attachment for a fishing rod and reel including a housing securable along said rod, a compressible spring within said housing, a plunger member carried by said compressible spring, a guide for said plunger secured to the housing and adapted to receive the line weight at the end thereof, means to compress and means to release said spring after compression whereby the plunger member strikes the line weight and projects the same with the line for casting purposes.

6. In a line throwing attachment for a fishing rod and reel including a housing securable along said rod, a guide communicating with said housing securable along said rod and being adapted to receive the line weight at the end thereof, a plunger movable within said housing and guide and means associated with the housing to propel the line weight at the end of the guide, said means being operable upon the plunger.

ZENO LITTMAN.